Dec. 23, 1969       W. L. FLOEHR      3,485,183
RAILWAY HOPPER GATE FLEXIBLE OPERATING ASSEMBLY WITH
RESILIENT GATE SEALING MEANS
Filed April 17, 1967                             2 Sheets-Sheet 1
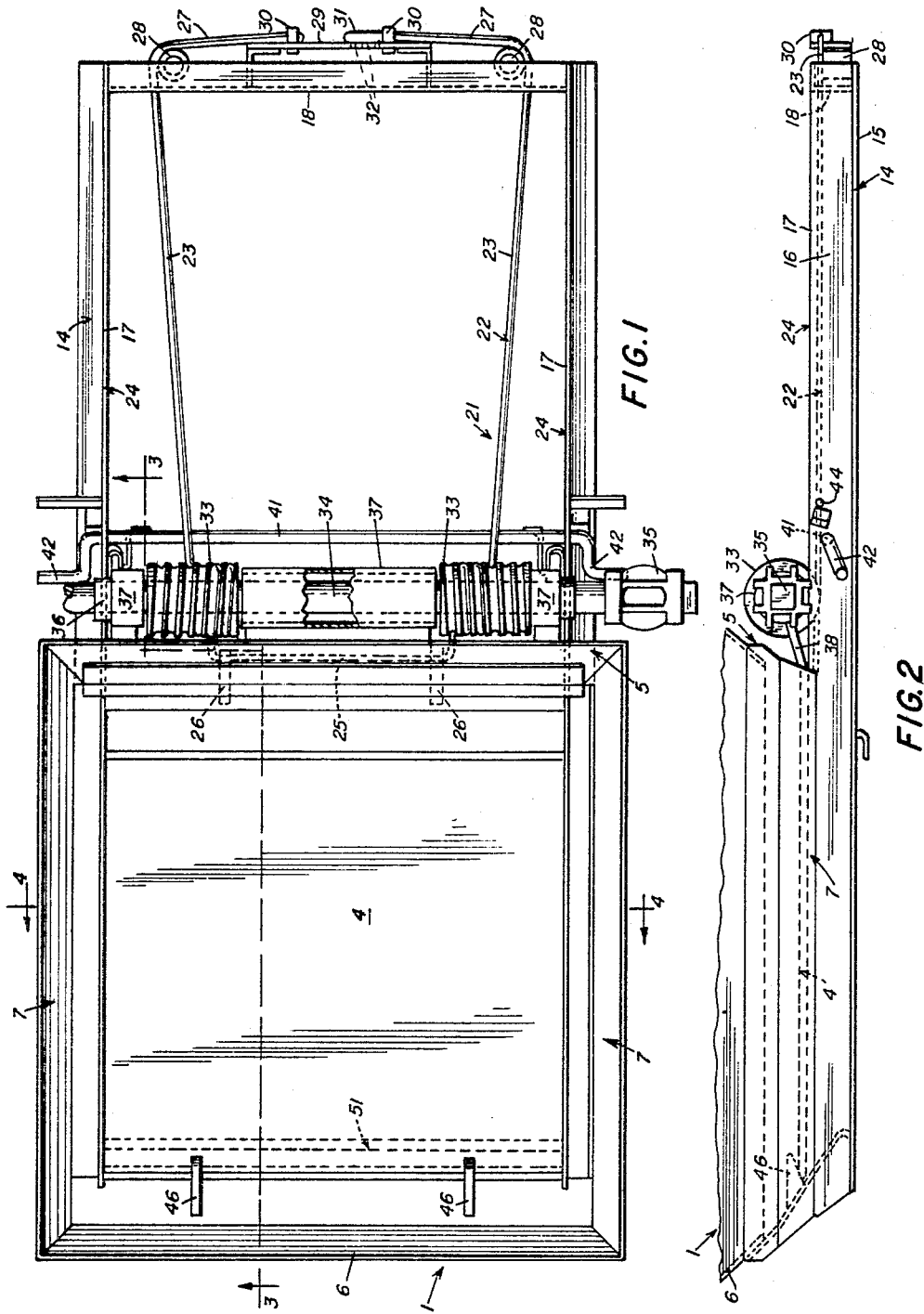
INVENTOR
WALTER L. FLOEHR
BY Wilmer Mechlin
HIS ATTORNEY

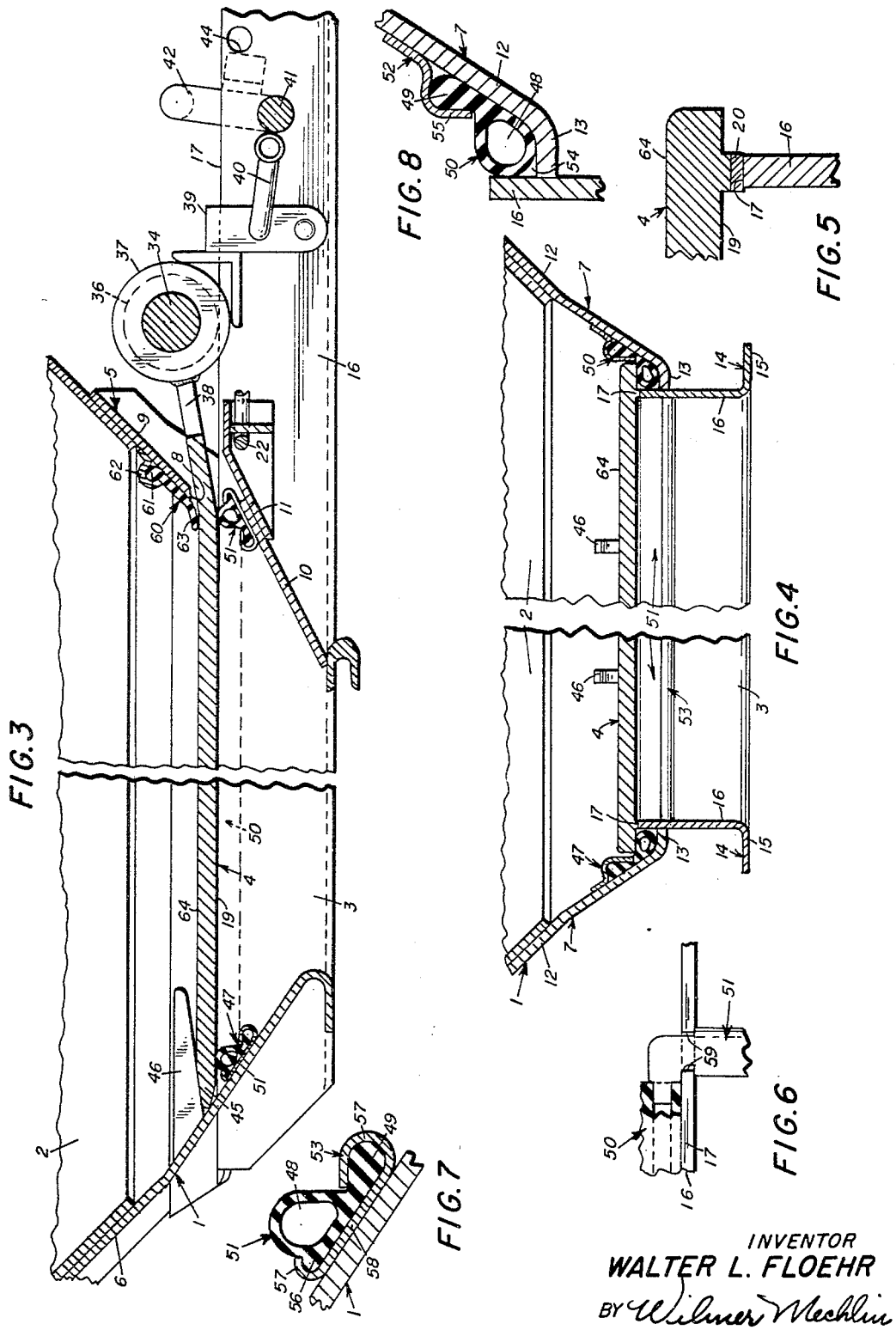

United States Patent Office 3,485,183
Patented Dec. 23, 1969

3,485,183
RAILWAY HOPPER GATE FLEXIBLE OPERATING ASSEMBLY WITH RESILIENT GATE SEALING MEANS
Walter L. Floehr, Toledo, Ohio, assignor, by mesne assignments, to Midland-Ross Corporation, Cleveland, Ohio, a corporation of Ohio
Filed Apr. 17, 1967, Ser. No. 631,543
The portion of the term of the patent subsequent to Mar. 18, 1986, has been disclaimed
Int. Cl. B61d 7/20, 7/26, 7/22
U.S. Cl. 105—282        10 Claims

ABSTRACT OF THE DISCLOSURE

A railway hopper car discharge gate slideable along rails between closed and open positions by a cable drive and positively sealed in closed position against escape of lading by underlying and overlying gaskets.

BACKGROUND OF THE INVENTION

The present invention is an improvement on the invention of my copending application Ser. No. 600,477, filed Dec. 9, 1966, now Patent No. 3,433,178, issued Mar. 18, 1969, in which, as in that application, a discharge gate is driven between open and closed positions, unconventionally, by a cable drive. As pointed out in that application, a cable drive permits a closer fit between the gate and its seat than does the usual rack and pinion drive. However, even such a fit will not entirely prevent the escape of very finely divided or highly comminuted lading and it is to that problem that the present invention particularly directs itself.

SUMMARY OF THE INVENTION

The primary object of the invention is to provide a discharge gate assembly in which a cable drive is combined with an effective seal against escape of even very finely divided lading.

Generally following the above-mentioned copending application in its cable drive, the gate assembly of this invention provides a rubber or like resilient seal in the gate's closed position, which, while acting primarily against the underside of the gate, is protected against full compression and the wear and inefficiency attendant thereto. The improved assembly of this invention also preferably uses for an underside seal rubber seals of basically the same configuration on all four sides of the gate, with the seals so attached to the gate frame to be readily replaceable and, in the case of the side seals, act as guides for the gate.

The foregoing and other objectives of the invention will appear hereinafter in the detailed description, be particularly pointed out in the appended claims and be illustrated in the accompanying drawings, in which:

FIGURE DESCRIPTION

FIGURE 1 is a plan view of a preferred embodiment of the gate assembly of the present invention;

FIGURE 2 is a side elevational view of the assembly of FIGURE 1 fixed to a hopper;

FIGURE 3 is a fragmentary vertical sectional view on an enlarged scale taken along lines 3—3 of FIGURE 1;

FIGURE 4 is a fragmentary vertical sectional view on the scale of FIGURE 3, taken along lines 4—4 of FIGURE 1;

FIGURE 5 is a further enlarged fragmentary sectional view on the section of FIGURE 4 showing the preferred construction for minimizing wear between the gate and its rails;

FIGURE 6 is a fragmentary plan view on an enlarged scale showing a joint between an end and side gasket;

FIGURE 7 is a fragmentary vertical sectional view on the section of FIGURE 3 and a further enlarged scale showing an end gasket and associated structure; and FIGURE 8 is a fragmentary vertical sectional view on the section of FIGURE 4 and a further enlarged scale showing a side gasket and associated structure.

DETAILED DESCRIPTION

Referring now in detail to the drawings in which like reference characters designate like parts, the improved slide gate assembly of the present invention is comprised of a gate frame 1 fixable or securable, as by welding, to a downwardly opening or discharging hopper 2 of a railway hopper car (not shown). Projecting or extending below the hopper 2 and conveniently formed as a weldment, the frame 1 bounds a discharge opening 3, and mounts a slide gate 4 for closing that opening.

In the illustrated frame 1 the discharge opening 3 is of the usual rectangular shape and bounded at the sides by front and rear walls 5 and 6 and side walls 7 of the frame. The front and rear walls 5 and 6 are oblique or inclined and downwardly convergent and the rear wall conveniently is continuous vertically. The front wall 5 is interrupted or divided vertically by a horizontally extended or elongated slot, entrance or gateway 8, into upper and lower plates 9 and 10, respectively, with the latter supported over its upper portion by a crossbrace 11. The preferred side walls 7, as well, are discontinuous with their upper parts 12 inclined and downwardly convergent and terminating downwardly in inturned horizontal bottom flanges 13. The lower parts or remainders of the side walls 7 preferably are formed by angle irons 14 having horizontally outstanding lower or bottom legs or flanges 15 and vertical or upstanding upper legs or flanges 16 straddled or embraced by and projecting above and each contacting or engaging one of the inturned bottom flanges 13 on the upper parts 12.

Between open and closed positions the gate 4 slides or rides through the gate-receiving slot 8 in the frame's front wall 5 on laterally spaced rails or guides 17, which suitably, are the parallel, coplanar upper edges of the vertical legs 16 of the angle irons 14. Extending sufficiently beyond the front wall 5 to support the gate 4 over its range of movement, the angle irons 14 are connected and uniformly spaced at their outer ends by a channel iron or other suitable crossbeam 18 and, adjacent the front wall 5, by the crossbrace 11. The gate is supported at the sides by the rails 17 but, desirably, is wider than the span or gauge of the rails so as to overhang or extend laterally beyond the latter at both sides. As the contacting areas of the gate and rails are quite narrow and wearing of grooves in the gate's underside 19 otherwise would inevitably result in time, the contacting or presented areas on the gate should be protected by stainless steel or like suitable wearplates 20.

The gate 4 is driven between closed and open positions by a cable drive 21 that in the illustrated embodiment differs in a number of details from but is generally similar to the drive shown in my application Ser. No. 600,477. The cable drive 21 includes a cable 22 having a pair of runs or legs 23 extending longitudinally and laterally spaced equidistantly from the longitudinal centerline of the track or guideway 24 formed by the rails 17, having as its inner or rear extremity a loop 25 lopped over and slideably held or anchored by laterally spaced slide anchors 26 conveniently fixed or secured to the crossbrace 11 on the frame 1 below the slot 8. Outwardly or frontwardly divergent, the runs 23 extend through the crossbeam 18 and have their laterally spaced outer or front ends 27 forming the corresponding extremity of the cable 22 turned inwardly toward each other by guides 28 fixed to the crossbeam. For clamping the cable ends 27, there is fixed to the front of the crossbeam an anchor plate 29 to which are attached cable clamps 30, one for each end. For adjusting the tension of the cable, one of the ends 27 has attached to it an eye 31 and its clamp 30 is selectively insertible in any of a series of laterally spaced holes 32 in the plate 29.

Intermediate the crossbrace 11 and crossbeam 18, the runs 23 are each wound or wrapped around one of a pair of oppositely helically grooved drums or pulleys 33 keyed or otherwise fixed equidistantly from the track's centerline, to an operating shaft 34 extending across the track 24 between the frame's front wall 5 and the crossbeam. Fitted, preferably at each end, with an actuating head 35 for insertion or other application of a suitable turning tool (not shown), the operating shaft 34 has, outside the pulleys 33, rollers 36 riding or rolling on the rails 17 and, between both pulleys and each pulley and the adjoining roller, collars 37, each having welded or otherwise fixed to it an aligned tongue 38 integral or rigid with and projecting forwardly from the gate 4, preferably radially, of the shaft.

For locking the gate 4 in closed position, there is provided on the inside of the vertical or rail member flange 16 of each angle iron 14 a U-shaped locking member 39 pivoted to the flange and connected by a crank arm 40 to a lock-operating rod 41 extending through and journaled in both flanges and having beyond each a conveniently integral handle 42. Swingable by the operating rod 41 between a vertical locking position and an oblique release position, the locking members 39 in locking position, with the gate 4 in closed position, are disposed outwardly and in the paths of angles or other stop members 43 suitably fixed to the outer collars 37 on the operating shaft 34 and in release position are removed from those paths. Apertures 44 in the flanges 16 permit the sealing of the operating rod 41 in locking position by the usual seals (not shown).

At its leading edge the gate 4 preferably has an integral or rigid tapered nose 45 engageable with overlying wedges 46 fixed to and instanding from the rear wall 6 of the frame 1 for forcing or pressing the gate downwardly against that wall and the rails 17, the latter in cooperation with the cable 22, which, because of the preferred anchoring of its longitudinal extremities below the level of the guideway 24, applies a like downward force to the gate's outer end through the shaft 34. However, as producing only metal-to-metal contact between surfaces that desirably are not finely machined for the purpose, such pressure would not insure that the gate would seal the discharge opening 3 against finely divided lading. For providing such sealing without expensive machining to close tolerances, the improved gate assembly includes a seal 47 with which the gate 4 is engaged about the discharge opening by elements of natural or synthetic rubber or other elastomeric material, hereinafter generally termed "rubber."

Engaging or contacting the underside or bottom 19 of the gate 4 on all sides of the discharge opening 3, the gate seal 47 of this invention has on each side of the opening a gasket having a tubular portion 48 engaging the gate and, at one side of that portion a solid beaded or bulbous flange 51 received and clamped on by a clip or retainer. Although the same in these respects, the preferred underside and end gaskets 50 and 51 and their side and end clips or retainers 52 and 53 differ otherwise.

The joints requiring sealing when the gate 4 is closed are at the sides between the gate and the rails 17 and at the ends between the gate and the rear wall 6 and the upper and lower plates 9 and 10 of the front wall 5. The gaskets 50 and 51 seal all but the joint with the upper plate 9. The side gaskets 50 seal the sides of the discharge opening 3 from the outside by having their tubular portions 48 at their bottoms and seated or received in the longitudinally extending recesses or pockets 54 in the side walls 7 between the upper parts 12 and the portions of the vertical flanges 16 of the angle irons 14 projecting above the instanding bottom flanges 15. Projecting, when free, above the recesses 54, the tubular portions 48, in the presence of the gate, are partly compressed thereby against the portions of the underside 47 of the gate overhanging the rails 17 and the outsides of the vertical flanges 16, thus both sealing the joints between the gate and the rails and being protected by the rails from overcompression. The upstanding beaded flanges or toe portions 49 of the side gaskets 50 are clamped against the upper parts 12 by the side clips 52 which are welded or otherwise fixed thereabove to the upper parts and have lower lips or flanges 55 acting both as clamps for the gasket beads and, backed by the beads, as side guides for the gate.

The preferred end gaskets 51 have, in addition to the beaded flanges 49 at one side of their tubular portions 49, tapered flanges or heel portions 56 on the other side. To mount these gaskets on the rear wall 6 and lower plate 10 of the front wall 5, the corresponding end clips 53 are generally channel-shaped, with inturned side flanges 57 for receiving and clamping the gasket flanges 49 and 56 and intervening webs 57 welded or otherwise fixed to the rear wall and lower plate. Both these flanges 57 and the lower flanges 55 of the side clips 52 may be bendable or deformable to a degree to facilitate application and removal of the gaskets.

While the relative positions of the tubular portions 48 and beaded flanges 49 of the end gaskets 51, are the reverse of those of the side gaskets 50, the end gasket tubular portions are so positioned as to wipe or rub against the underside 19 and be partly compressed by the gate 4 when the latter is in closed position, with the extent of the compression limited by the rails 17 on which the weight of the gate and any lading thereabove is supported. If desired, the end gaskets 51 can be ended at the rails, with their ends overlapped longitudinally by the side gaskets. However, for a positive seal all around against the underside 19, it is preferred that the side gaskets 50 end short of the parts of the tubular portions 48 of the end gaskets 51 between the rails 17 and that those portions extend through cross slots 59 therefor in the rails and be inturned and inserted into or otherwise jointed to the ends of the tubular portions of the side gaskets and be bonded thereto.

The resultant continuous gasket formed by the joined side and end gaskets 50 and 51 effectively seals against escape of any lading through the gate 4 into the discharge opening 3. This leaves as the only place of escape of lading when the gate is closed the joint between the gate and the upper plate 9 of the front wall 5. For closing that joint the gate seal 47 includes a rubber flap gasket 60 having a beaded head 61 clamped to the plate 9 by retainer or clip 62 fixed to the plate's inner side and a depending flap 63 extending across the gate slot or opening 8 and wiping or rubbing against the gate's upper side 64. Held down against the rails 17 in closed position at the front by the wedges 46 and at the rear by the downward force exerted by the cable 22 on the operating shaft 34, the gate 4, with the gate seal 47, thus provides an effective, positively sealed, closure for the hopper 2 to which the improved gate assembly is applied.

From the above detailed description it will be apparent that there has been provided an improved discharge gate assembly for a hopper of a railway hopper car which advantageously combines a cable drive with a positive gasket seal. It should be understood that the described and disclosed embodiment is merely exemplary of the invention and that all modifications are intended to be included that do not depart from the spirit of the invention and the scope of the appended claims.

Having now described my invention, I claim:

1. A railway hopper car discharge gate assembly, comprising a frame secured to and bounding a discharge opening of a hopper, a guideway fixed to the said frame, a discharge gate for said opening and slideable between open and closed positions along said guideway, an operating shaft connected beyond a front wall of said frame to a front end of said gate for longitudinal movement in unison with and rotary movement relative to said gate, cable means extending and anchored at opposite longitudinal extremities against substantial movement longitudinally of said guideway and driveably engaged by said shaft for causing said shaft and gate on rotation of said shaft to travel longitudinally of said guideway, and sealing means operative in the closed position of said gate for sealing therebetween and said frame against leakage of lading.

2. A discharge gate assembly according to claim 1, wherein the shaft rolls on the guideway, and longitudinal extremities of the cable means are anchored to the frame beyond opposite limits of travel of the shaft thereon.

3. A discharge gate assembly according to claim 2, wherein the extremities of the cable means are anchored to the frame below the level of the guideway.

4. A discharge gate assembly according to claim 2, wherein the sealing means include gaskets at sides and ends of the discharge opening, said gaskets having portions engaging the underside of and compressed by the gate in the closed position thereof, and in said closed position the weight of the gate and any lading thereabove is supported and the compression of said portions is limited by the guideway.

5. A discharge gate assembly according to claim 4, wherein the gate slides through a slot in the front wall of the frame, and the sealing means include a gasket attached to an inner side of the front wall above and engaging an upper side of the gate along said slot.

6. A discharge gate assembly according to claim 5, wherein the frame has side walls connected and spaced by end walls of which one is the front wall, and the sealing means include clips each fixed and releasably clamping one of the gaskets to one of said side and end walls.

7. A discharge gate assembly according to claim 6, wherein the clips clamping the side gaskets to the side walls also act as side guides for the gate on movement thereof between closed and opened positions.

8. A discharge gate assembly according to claim 7, wherein the longitudinal extremities of the cable means are fixed to the frame below the level of the guideway, and including wedge means fixed to the frame above and acting on a leading end portion of the gate as the gate approaches closed position, and the wedge means and cable means cooperate for holding the gate down against the guideway.

9. A discharge gate assembly according to claim 7, wherein the gasket portions compressed by the gate in the closed position thereof are joined to form a continuous seal against the underside of the gate above the discharge opening.

10. A discharge gate assembly according to claim 9, wherein the portions of the end gaskets extend through slots in the guideway for joining to the side gaskets.

References Cited

UNITED STATES PATENTS

| | | | |
|---|---|---|---|
| 396,140 | 1/1889 | Canda | 105—282 |
| 887,225 | 5/1908 | Post | 298—27 |
| 1,122,918 | 12/1914 | Hart et al. | 105—282 XR |
| 2,094,979 | 10/1937 | Dietrichson | 105—282 |
| 2,250,524 | 7/1941 | Dietrichson | 105—307 |
| 2,859,707 | 11/1958 | Dorey | 105—282 XR |
| 3,075,477 | 1/1963 | Sinhoff | 105—283 XR |

ARTHUR L. LA POINT, Primary Examiner

H. BELTRAN, Assistant Examiner

U.S. Cl. X.R.

105—295, 300, 306, 424